No. 852,316. PATENTED APR. 30, 1907.
C. BURMEISTER & E. BOLDT.
CULTIVATOR SHOVEL OR TOOTH.
APPLICATION FILED JAN. 2, 1907.
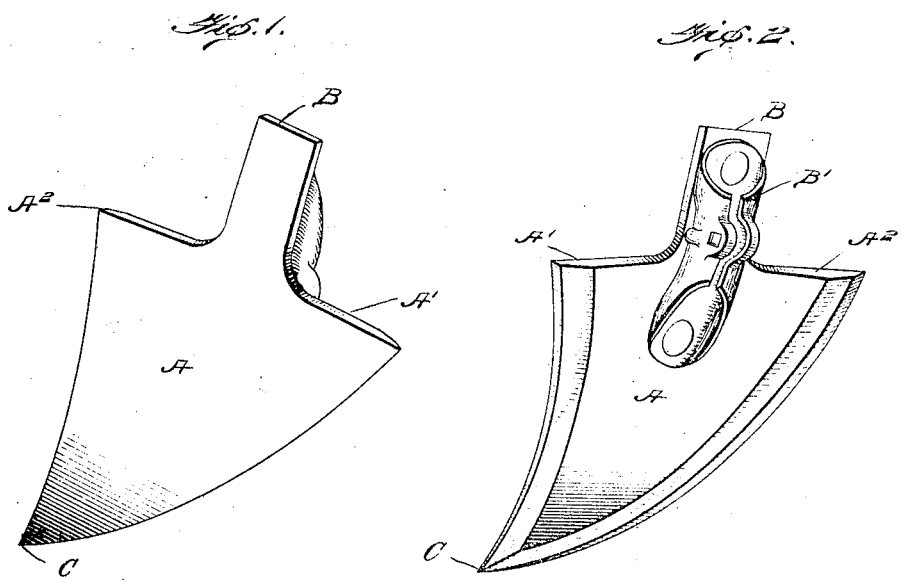
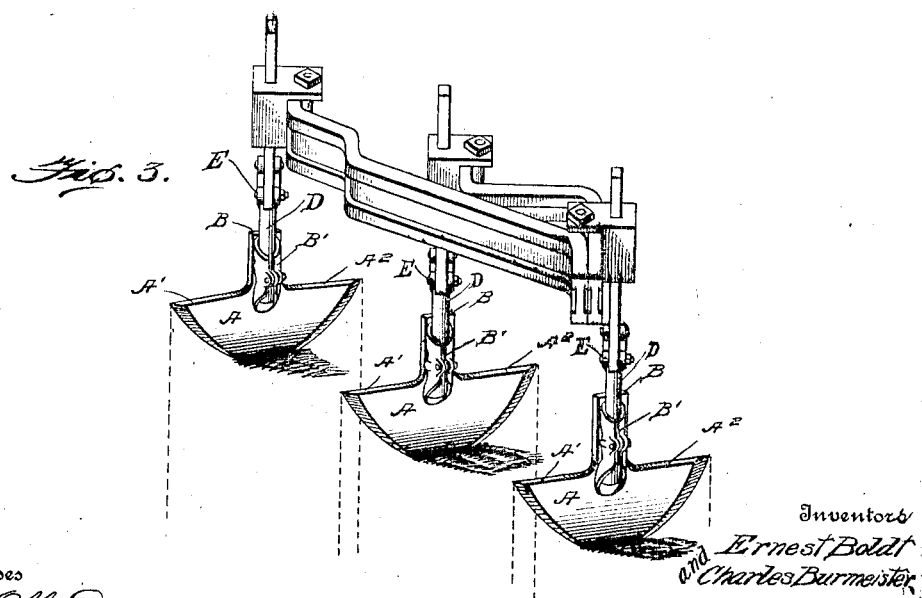

UNITED STATES PATENT OFFICE.

CHARLES BURMEISTER AND ERNEST BOLDT, OF CALUMET, IOWA.

CULTIVATOR SHOVEL OR TOOTH.

No. 852,8

Specification of Letters Patent.

Patented April 30, 1907.

Application filed January 2, 1907. Serial No. 350,547.

*To all whom it may concern:*

Be it known that we, CHARLES BURMEISTER and ERNEST BOLDT, citizens of the United States, residing at Calumet, in the county of O'Brien and State of Iowa, have invented certain new and useful Improvements in Cultivator Shovels or Teeth, of which the following is a specification.

This invention relates to a cultivator shovel or tooth and consists in the construction and arrangement of its parts which will be fully described in the specification, illustrated in the drawings, and particularly pointed out in the claims.

One object of our invention is to provide a cultivator shovel or tooth which can be used with, and readily adapted to, any and all of the practical cultivators now in general use.

Another object of our invention is to provide a cultivator shovel or tooth which can be set to plow a shallow or deep furrow, readily; and with satisfactory results.

A further object of our invention is to provide a cultivator shovel or tooth which can be set in gang sets of teeth and so arranged as to cultivate all the ground between rows of corn, potatoes, tobacco, cotton, cabbage, and other grains or vegetables which require close and careful cultivation.

A still further object of our invention is to provide a cultivator shovel or tooth which shall be strong and durable, easily managed and readily sharpened and kept in good working order.

We accomplish these objects with the cultivator shovel or tooth, shown and illustrated in the accompanying drawings forming a part of this application, and in which Figure 1 is a front elevation of our cultivator shovel or tooth; Fig. 2 is a perspective view of the same, showing means of attachment; and Fig. 3 is an illustrated view, showing how the shovel can be arranged in gangs with a cultivator.

In the drawings, A represents the shovel or tooth and A' and A² its wings; B represents the shank of the shovel and B' the holder on the shank by which it can be attached, and C the point.

Heretofore cultivator shovels or teeth have been made of various forms and of different kinds of material such as cast-iron, cast-steel and sheet-steel. They have also been made for the purpose of accomplishing different objects, such as general strength, deep plowing and other features. No one, so far as we know, has ever sought to provide a cultivator shovel or tooth which could be used with any practical cultivator, in other words, an universal device. The construction of our shovel, on account of the shape of its blade and wings, and of its shank, renders it readily adaptable to all cultivators.

Our shovel or tooth may be used for shallow or deep plowing by reason of the facility with which the blade can be adapted on the holder, by reason of the curve of the blade and the construction of the wings A', A², making the blade practically an equilateral triangle. Our cultivator shovel or tooth may also be set in gangs, as shown in Fig. 3, so that the benefits arising from the combination of a multiple or series of shovels or teeth may be allowed to be a cultivator at any required angle. This feature is also due to the construction and shape of the shovel or tooth, and its ready adjustment of the same on the holder.

The holder shown in Fig. 2, or a holder of equivalent structure, by which the shovel or tooth may be closed down or extended on an arm, D, makes this advantage possible. This arm, D, may be provided with a joint E by which the shovel or tooth, A, may be given any desired angle for plowing a deep or shallow furrow.

Strength and durability are of the greatest importance in a cultivator shovel or tooth, and for that reason our device is preferably made very strong. As shown in Fig. 2, the shovel or tooth being made of unusual thicknesses, preferably of three or more thicknesses of steel, and so formed that the front of the shovel shall be greater in surface than the back, thus permitting of the sharpening of the same without interfering with the rear layers. The thickness, due to the number of layers of steel, makes the shovel or tooth strong and durable.

The point of the shovel C is practically equidistant from the extreme corners of the wings A', A², and in direct line with the midway line of the shank B, thus making the blade practically an equi-lateral triangle.

Having fully described our invention, what we claim and desire to secure by Letters Patent is:

The herein described cultivator shovel or tooth, comprising a curved blade having equilateral and triangular formed sides and top, said blade having a central shank, and a clamp holder secured to the rear surface of said shank for adjusting the blade upward and downward on the carrying arm, substantially as described.

In testimony whereof we affix our signatures, in presence of two witnesses.

CHARLES BURMEISTER.
ERNEST BOLDT.

Witnesses:
C. F. EGGEN,
GEO. SHAFER.